(12) United States Patent
Darsey et al.

(10) Patent No.: US 11,161,660 B2
(45) Date of Patent: Nov. 2, 2021

(54) CAP FOR RESUPPLYING CARBON DIOXIDE TO A CARBONATED BEVERAGE CONTAINER

(71) Applicant: **WE*HAVE*SOLUTIONS; LLC**, Little Rock, AR (US)

(72) Inventors: Jerry Darsey, Little Rock, AR (US); Sylvia Szwedo, Little Rock, AR (US)

(*) Notice: Subject to any disclaimer, the term of this patent is extended or adjusted under 35 U.S.C. 154(b) by 242 days.

(21) Appl. No.: 16/536,062

(22) Filed: Aug. 8, 2019

(65) Prior Publication Data
US 2021/0039849 A1 Feb. 11, 2021

(51) Int. Cl.
| | | |
|---|---|---|
| *B65D 51/28* | (2006.01) | |
| *B65D 85/72* | (2006.01) | |
| *B01F 3/04* | (2006.01) | |
| *A23L 2/54* | (2006.01) | |
| *B01F 15/02* | (2006.01) | |

(52) U.S. Cl.
CPC ............ *B65D 51/2835* (2013.01); *A23L 2/54* (2013.01); *B01F 3/04801* (2013.01); *B01F 15/0212* (2013.01); *B65D 85/72* (2013.01); *A23V 2002/00* (2013.01); *B01F 2003/049* (2013.01); *B01F 2215/0022* (2013.01)

(58) Field of Classification Search
CPC . B65D 51/2835; B65D 85/72; B01F 3/04801; B01F 15/0212; B01F 2003/049; B01F 2215/0022; A23L 2/54
USPC .................................. 215/227; 206/219, 222
See application file for complete search history.

(56) References Cited

U.S. PATENT DOCUMENTS

| | | | | |
|---|---|---|---|---|
| 1,644,821 | A * | 10/1927 | Eckart | B44D 3/122 206/221 |
| 2,631,521 | A * | 3/1953 | Atkins, Jr. | B65D 51/2814 99/275 |
| 3,039,664 | A * | 6/1962 | Harrison | G09F 7/00 225/18 |
| 3,347,410 | A * | 10/1967 | Schwartzman | B65D 51/2835 222/80 |
| 7,921,993 | B1 * | 4/2011 | Zammit | B65D 51/225 206/222 |
| 2005/0230415 | A1 * | 10/2005 | Forgac | B01F 3/04794 222/1 |
| 2008/0179331 | A1 * | 7/2008 | Sharp | B65D 51/2835 220/521 |
| 2009/0020495 | A1 * | 1/2009 | Cheng | B65D 51/2835 215/316 |
| 2009/0242561 | A1 * | 10/2009 | Wellman | B65D 51/2828 220/277 |
| 2011/0174642 | A1 * | 7/2011 | Coon | B65D 51/2835 206/222 |
| 2014/0083879 | A1 * | 3/2014 | Ulstad | B65D 51/225 206/222 |
| 2014/0311929 | A1 * | 10/2014 | Tickle | A61K 31/4439 206/219 |

(Continued)

*Primary Examiner* — James N Smalley
(74) *Attorney, Agent, or Firm* — Wright, Lindsey & Jennings LLP; K. Brandon Middleton

(57) ABSTRACT

A cap useful for reviving the carbonation level of a carbonated beverage, the cap configured to be screwed on the opening of the beverage bottle, the cap having a pressurized gas compartment that is sealed until selectively pierced by the user by pressing on a piercing means, after such piercing of the seal, the gas inside the pressurized gas compartment is free to move into the beverage container and into the liquid, providing carbonation to the liquid.

7 Claims, 3 Drawing Sheets

(56) References Cited

U.S. PATENT DOCUMENTS

2019/0344950 A1* 11/2019 Brace .................... B65D 51/28

* cited by examiner

CAP FOR RESUPPLYING CARBON DIOXIDE TO A CARBONATED BEVERAGE CONTAINER

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The carbonated beverage industry is one of the most prolific industries in the United States and across the world. In fact, the carbonated soft drink industry sees multi-billion dollars in yearly revenues in the U.S. alone, and some of the world's leading soft drink companies have been in existence for more than one hundred years. These companies sell a wide variety of carbonated beverages—from sugary sodas, low-calorie and diet sodas, and even carbonated waters and juices. And these different beverages all come in a variety of sizes—from small bottles holding as little as 160 ml of the beverage to large bottles holding 2000 ml (commonly referred to as a "two liter"), While the flavors of these beverages may change, the good-taste often relies on the carbon dioxide dissolved in the liquid. The carbon dioxide is dissolved in the liquid at high pressures and once the pressure is removed (e.g. by unscrewing the cap on the bottle) the carbon dioxide is released from the solution in small bubbles, which gives rise to fizz or effervescence. These carbon dioxide bubbles give these carbonated drinks their bite—the carbon dioxide is converted into a weak acid (carbonic acid). It is this process that gives carbonated beverages their crisp taste.

Unfortunately, carbon dioxide molecules have a natural tendency to leave the solution, escaping from the salutation as a gas. Of course, when the carbon dioxide escapes a carbonated beverage, part of that taste sensation is lost and the beverage is no longer desirable. When a carbonated beverage has lost so much carbon dioxide that it no longer fizzes or has a pleasant taste, many describe the beverage as having gone "flat." A beverage gong flat is exacerbated by the release of the pressure of the container when: the cap is removed, and once the bottle is open, the beverage can go flat in as little as a day or two. While this may not be an issue with smaller containers that can be open and finished before the beverage goes flat, this is a problem that arises a lot with larger containers (such as the two liter) of beverages. When a container is opened and the beverage goes flat before the consumer can drink the whole container, the beverage is typically considered waste. To keep these beverages from being wasted, a solution capable of re-introducing carbon dioxide into the liquid even after the original seal on the container is broken (and thus the carbon dioxide begins to escape) is needed.

BRIEF SUMMARY OF THE INVENTION

Generally speaking, the present invention is directed to a cap for resupplying a soluble gas (such as, for example, carbon dioxide) to a previously opened beverage container. More particularly, the present invention is directed to a cap that has a pressurized carbon dioxide chamber, such that the cap can be used to close a previously opened carbonated beverage container and resupply carbon dioxide to the liquid inside the carbonated beverage container. The carbon dioxide chamber is positioned inside the cap such that when the cap is affixed to the carbonated beverage container, the chamber is inside the internal recess of the cap, which is fluidically connected to the fluid compartment of the container. Once the cap is securely affixed to the container, the chamber can be penetrated to allow for the release of the carbon dioxide from the chamber into the container. This process revives the flat carbonated beverage as carbon dioxide is reintroduced into the beverage even after the initial carbon dioxide levels have decreased significantly.

These and other objects, features, and advantages of the present invention will become better understood from a consideration of the following detailed description of the preferred embodiments and appended claims in conjunction with the drawings as described following:

DETAILED DESCRIPTION OF THE INVENTION

Figure 1:
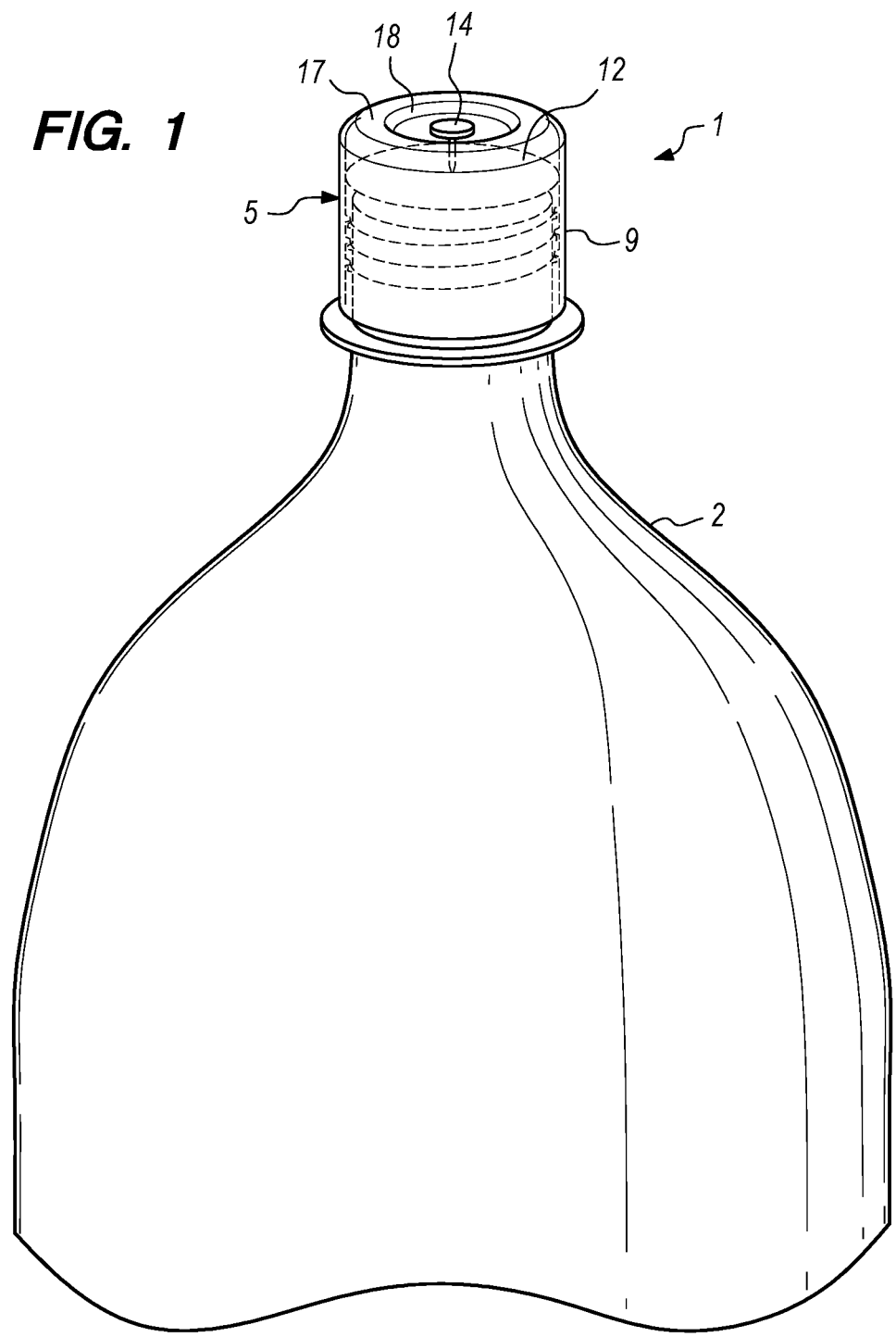
FIG. 1 shows one embodiment of the cap of the present invention on a beverage container.

Generally speaking, the present invention is directed to an improved lid for liquid containers. In particular the present invention is directed to a lid 1 for resupplying a soluble gas 3 to a previously opened liquid container 2. Even more particularly, the present invention is directed to a lid 1 that has a pressurized soluble gas chamber 4 pressurized with a soluble gas 3, such that the lid 1 can be used to close a previously opened liquid container 2 and resupply the soluble gas 3 to the liquid inside the container 2. It may be seen then, that the lid 1 of the present invention both serves to close or seal a previously opened container 2 and as a means for supplying soluble gas 3 to the newly closed container 2. While it may be seen, of course, that the present invention may be described with reference to the soluble gas 3 being carbon dioxide and the liquid container 2 being a carbonated beverage container, given that carbon dioxide is the most commonly used soluble gas for sodas and other similar beverages, is understood that the pressurized chamber 4 may include any number of soluble gases 3 that may enhance taste or other characteristics of the liquid in the container 2 and the liquid may include any liquid or solution to which the soluble gas 3 is desired to be introduced. For ease of describing the invention, however, the soluble gas 3 may be described with reference to carbon dioxide and the liquid container 2 may be described with reference to a carbonated beverage container. Furthermore, while it is understood that any configuration of the lid 1 and container 2 may fall within the scope of the invention, for purposes of describing the invention, the lid 1 may be described with reference to a cap and the container 2 may be described with reference to a bottle.

Figure 2:
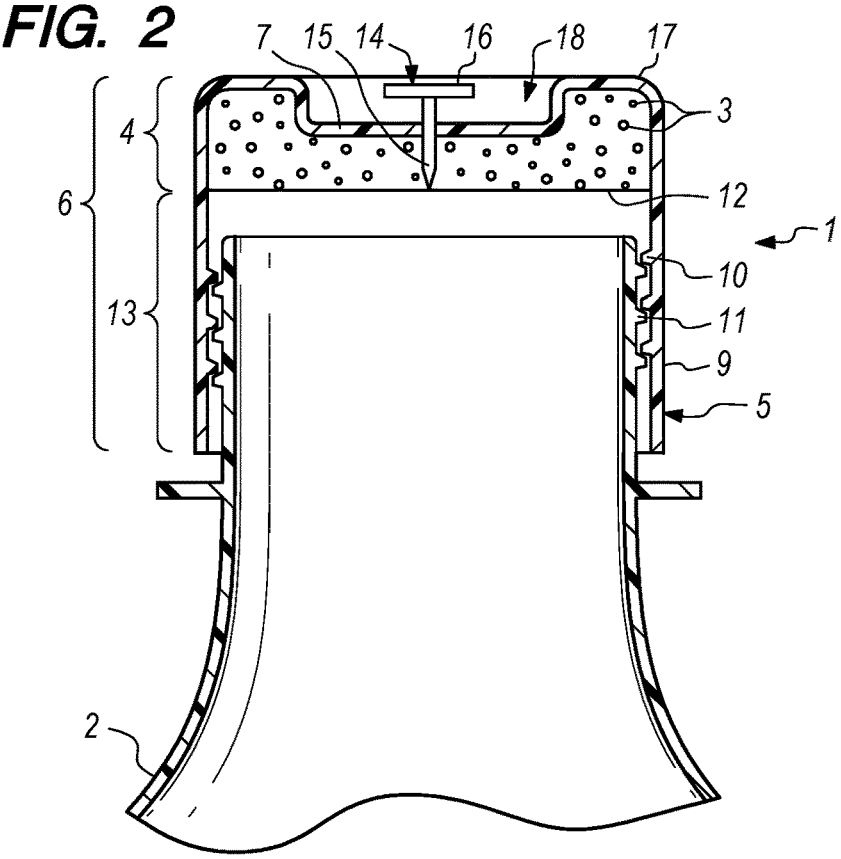
FIG. 2 shows a cut-away view of one embodiment of the cap of the present invention in the sealed position.
Figure 3:
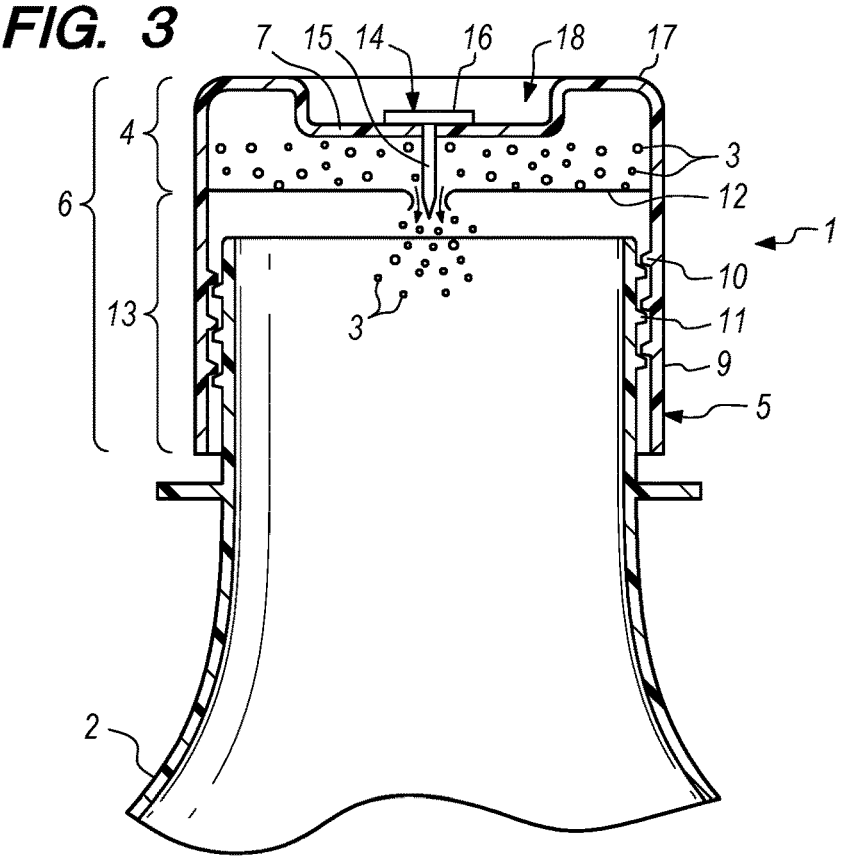
FIG. 3 shows a cut-away view of one embodiment of the cap of the present invention in the pierced position.

Turning to FIGS. 2-3, the preferred embodiment of the present invention may now be described. In the preferred embodiment, the present invention comprises a cap 1 defined by a housing 5 having an internal recess 6 which is closed at its upper end by an upper wall 7 and open 9 at the opposite end (thereby exposing the internal recess 6). One or more side walls 9 (for example, a cylindrical side wall extending the complete circumference of the upper wall 7) extends downwardly from the edge of the upper wall 7 to form the housing 5. In the preferred embodiment, for example, the cap 1 is formed as a substantially cylindrical component with a closed upper end 7 and an open bottom end 8. Each of the upper wall 7 and side wall(s) 9 include an internal surface 7a, 9a and an external surface 7b, 9b the internal surface 7a, 9a being defined as the surface located within the recessed portion 6 of the cap. The internal surface 9a (or at least a portion thereof) of the side wall(s) 9 is threaded 10 such that the cap 1 may be screwed onto the counter-threaded 11 opening of a beverage container 2 to close the opening of the container 2. It may be seen, then, that the cap 1 may be used to seal or substantially seal a container 2 that has previously been opened (whether the container 2 was originally sealed by the same cap 1 or a different sealing means).

Positioned inside the internal recess 6 of the cap 1 is an internal dividing wall 12 which separates the internal recess 6 into two sections, an upper chamber 4 positioned between the internal wall 12 and the upper wall 7 and a lower open-section 13 positioned between the internal wall 12 and the open bottom 8. In the preferred embodiment, the internal wall 12 is a circular wall with edges extending to each point on the inner surface 9a of the side walls 9, thereby providing a fluid-tight seal between the upper chamber 4 and open bottom section 13. Thus, this internal wall 12 may be described as a sealing panel 12, as this internal wall 12 is operable to create a seal between the upper chamber 4 and the open bottom portion 13 of the internal recess 6. The upper chamber 4 is pressurized with the soluble gas 3 (such as carbon dioxide), which is sealed inside the chamber 4 until released by piercing the sealing panel 12 (and thereby fluidically connecting the gas chamber 4 and the open bottom portion 13 of the recess 16) as described below. Because the open bottom portion 13 of the recess 6 is fluidically connected to the container 2 opening through the open end 8 of the cap 1 when the cap 1 is affixed to the container 2, piercing the sealing panel 12 allows for flow of the gas 3 from the chamber 4 into the container 2 through the open end 8 of the cap 1, where the gas 3 may dissolve into the liquid.

As indicated above, the gas chamber 4 is initially sealed with the sealing panel 12 thereby preventing release of the gas 3 (carbon dioxide, for example) from the chamber 4. After the container 2 has been opened and gone "flat", it may be desired for the user to release the carbon dioxide from the chamber 4 into the liquid stored in the container 2. The present invention includes a piercing means 14 that allows the user to selectively pierce the sealing panel 12, thereby releasing the gas 3 from the chamber 4 when desired. It is contemplated that the piercing means 14 can be any object capable of selective piercing of the sealing panel 12, such as a tack, pin, or other similar object. In the preferred embodiment, as shown in FIGS. 2-3, the piercing means 14 includes a piercing portion 15 and a pressing portion 16, with the piercing portion 15 configured to pierce the sealing panel 12 when the pressing portion 16 is pressed by the user (whereby the user pressing the pressing portion 16 moves the piercing means 15 from a sealed position as shown in FIG. 2 to a piercing position as shown in FIG. 3). The piercing means 14 is affixed to the cap 1 such that the piercing portion 15 is inside the chamber 4 when the piercing means 14 is in the sealed position (FIG. 2). While the piercing portion 15 is inside the chamber 4, the pressing portion 16 is outside of the chamber 4 and external to the recess portion 6 of the cap 1 altogether (FIG. 2), thereby providing the user access to the pressing portion 16. Once the user desires to pierce the sealing panel 12, the user presses the pressing portion 16 of the piercing means 14, thus moving the piercing means 15 into the piercing position (FIG. 3)—at which time the piercing portion 15 of the piercing means 14 penetrates the sealing panel 12 separating the upper chamber 4 from the open bottom portion 13 of the cap 1. The carbon dioxide 3 contained in the chamber 4 is then released into the open bottom portion 13 of the cap 1 where it then moves through the open end 8 of the cap 1 into the beverage container 2 and into the liquid.

Figure 4:
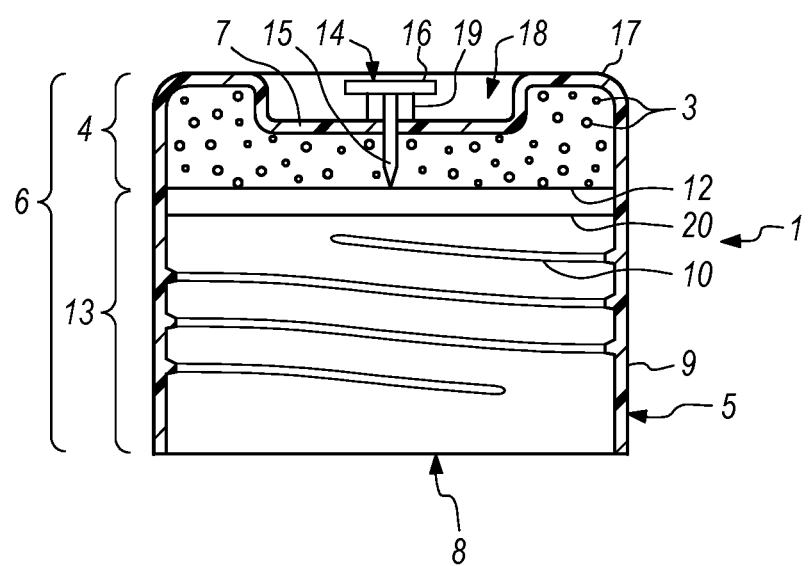
FIG. 4 shows a cut-away view of one embodiment of the cap of the present invention in the sealed position.

In the preferred embodiment, as described, the piercing means 14 includes a pressing portion 16 that is positioned on the outside of the upper wall 7 of the cap 1, Once the pressing portion 16 is pressed sufficiently to pierce the sealing panel 12, the sealing panel 12 is pierced and the carbon dioxide 3 in the chamber 4 is released from the chamber 4. In one embodiment, the sealing panel 12 is unable to be resealed once it is pierced. It is contemplated then that without some protection, accidental piercing of the sealing panel 12 may result from accidental pressing of the pressing portion 16 of the piercing means 14. This, for instance, might occur if the pressing portion 16 is accidentally pressed during storage of the caps 1 when they are not affixed to a container 2, during storage of the beverage container 2 with the cap 1 affixed to the container 2, or in any other instances when the user does not intend to release the carbon dioxide 3 from the pressurized chamber 4. This accidental pressing may result in the premature release of the carbon dioxide 3 from the chamber 4, which may ultimately mean the failure to reintroduce carbon dioxide 3 into the beverage at the appropriate time (as in one embodiment the sealing panel 12 cannot be resealed once it has been pierced, and thus, the chamber 4 cannot be repressurized once the gas 3 has been released). To combat the unintentional release of gas from the chamber by the accidental pressing of the piercing means, the present invention preferably includes a protection means for protecting the pressing portion 16 from accidental pressing. The protection means may be, for example, a raised lip 17, a locking piece 19 (as shown in FIG. 4), or an additional sealing panel 20 (as shown in FIG. 4). These protection means may be used individually or in combination thereby to combat the unintentional release of gas from the chamber.

As noted above, in one embodiment (and particularly where the pressing portion 16 is positioned outside the upper wall 7 of the cap 1), a raised lip 17 around the outer edges of the upper wall 7 is included as a protection means for combating the unintentional release of gas 3 from the chamber 4. It may be seen that because the lip 17 is raised, there is a second recess 18 created, this recess 18 above the upper wall 7 of the cap 1, defined by the height of the raised lip 17. The pressing portion 16 is positioned in the recess 18 such that the raised lip 17 extends to a height above the pressing portion 16. It may be seen, then, that if a bottle 2 is stacked on top of another bottle 2, for example, the bottom surface of the top bottle 2 will rest on the raised lip 17. Because the pressing portion 16 is positioned below the plane of the raised lip 17 and inside the recess 18, the pressing portion 16 will not accidentally be pressed by the bottom surface of the top bottle 2, which is prevented from extending into the recess 18 by the raised lip 17. In another embodiment, the protection means may be a locking piece 19 as shown in FIG. 4. The locking piece 19 is preferably a piece of rigid material (such as plastic) that is positioned between the pressing portion 16 of the piercing means 16 and the upper surface 7 of the cap. Because the locking piece 19 is rigid, it prevents the piercing means 14 from moving into the piercing position even when accidental force is applied to the pressing portion 16 of the piercing means 14. In order to move the piercing means 14 into the piercing position (and thereby release the gas 3 from the chamber 4) the locking piece 19 must be removed so that the piercing means 14 can move upon application of force to the pressing portion 16. In yet another embodiment, the protection means may be an additional sealing panel (or multiple additional sealing panels) 20 that is positioned between the original sealing panel 12 and the open end 8 of the cap. This/these additional sealing panel(s) 20 serve to keep the gas 3 contained in the event that the original sealing panel 12 is accidentally opened by the piercing means 16. As noted above, these protection means may be used individually or in combination to prevent accidental release of the gas 3 from the chamber 4.

In the preferred embodiment, the cap 1 is configured to be sold and packaged separately from the original beverage container 2 such that when the original cap is removed from the container 2 (which is carbonated during the manufacturing process), the cap 1 of the present invention can replace the original cap and reintroduce carbon dioxide 3 into the beverage. However, t is contemplated, of course, that the cap 1 of the present invention may be included as the original cap, provided that the intention is that the sealing panel 12 is not pierced until the original carbonation level in the container 2 decreases below a minimal desired carbonation level. Furthermore, while the present invention has been described in terms of the preferred embodiment above, the invention is not so limited. For example, while the present invention has been described such that the chamber 4 is positioned inside the recess 6 of a cap 1 having side walls 9 and an upper wall 7, it is contemplated that the chamber 4 may be positioned elsewhere so long as it is fluidically connected to the cap recess 6 (and therefore the internal compartment of the container 2 when the cap 1 is fixed to the container 2). Thus, for example, the present invention may be configured such that the carbon dioxide chamber 4 is positioned in a side extension of the cap 1 or elsewhere (not shown).

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification. When a range is stated herein, the range is intended to include all sub-ranges within the range, as well as all individual points within the range. When "about," "approximately," or like terms are used herein, they are intended to include amounts, measurements, or the like that do not depart significantly from the expressly stated amount, measurement, or the like, such that the stated purpose of the apparatus or process is not lost.

The present invention has been described with reference to certain preferred and alternative embodiments that are intended to be exemplary only and not limiting to the full scope of the present invention.

We claim:

1. A lid useful for supplying a soluble gas to a container, the lid comprising:
   a. an internal recess configured to be fluidically connected to the container;
   b. a first sealing panel positioned inside the internal recess, wherein the first sealing panel is operable to divide the internal recess into an upper chamber and an open bottom chamber, further wherein the upper chamber is pressurized with the soluble gas;
   c. a lip external to the internal recess, wherein the lip comprises a height forming an external recess; and
   d. a piercing means configured to selectively pierce the first sealing panel, wherein the piercing means comprises a piercing portion positioned inside the internal recess and a pressing portion positioned inside the external recess,
   wherein the pressing portion of the piercing means is configured to be selectively pressed, wherein pressing the pressing portion causes the piercing portion to pierce the first sealing panel, thereby releasing the soluble gas from the upper chamber into the open bottom chamber, thereby releasing the soluble gas into the container; and
   wherein the lip is operable to substantially prevent an unintentional pressing of the pressing portion, thereby preventing an unintentional release of the soluble gas into the container.

2. The lid of claim 1, further comprising a locking piece configured to prevent movement of the piercing means, thereby preventing the piercing means from piercing the first sealing panel.

3. The lid of claim 1, further comprising a second sealing panel positioned between the first sealing panel and the container.

4. The lid of claim 1, wherein the piercing means comprises a tack.

5. The lid of claim 1, wherein the soluble gas comprises carbon dioxide.

6. The lid of claim 1, wherein the internal recess comprises an at least partially threaded surface, the threaded surface configured to engage a counter-threaded portion of the container, thereby affixing the lid to the container.

7. The lid of claim 1, wherein the container comprises a bottle.

* * * * *